United States Patent [19]

Collender

[11] 4,176,923
[45] Dec. 4, 1979

[54] STEREOSCOPIC MOTION PICTURE LARGE SCALE SCANNING REPRODUCTION METHOD AND APPARATUS

[76] Inventor: Robert B. Collender, 709 Patterson Ave., Glendale, Calif. 91203

[21] Appl. No.: 949,502

[22] Filed: Oct. 10, 1978

[51] Int. Cl.² .......................................... G03B 35/00
[52] U.S. Cl. ..................................... 352/58; 352/43; 352/81; 353/10
[58] Field of Search ................ 352/43, 58, 81; 353/7, 353/10

[56] References Cited

U.S. PATENT DOCUMENTS

| | | | |
|---|---|---|---|
| 3,324,760 | 6/1967 | Collender | 353/7 |
| 3,743,394 | 7/1973 | Meszlenyi | 352/43 |
| 3,815,979 | 6/1974 | Collender | 352/58 |
| 4,089,597 | 5/1978 | Collender | 352/58 |

Primary Examiner—Monroe H. Hayes

[57] ABSTRACT

The invention involves theatre size stereoscopic motion pictures without glasses and without restricted viewing zones and which can be photographed with a standard motion picture camera. Relative lateral motion is required between the camera and the scene. The film is run horizontally through a scan projector in which a given scene on the screen is constructed from several adjacent scenes on the film. The scanned stereoscopic picture can be viewed from different perspectives. A central 3-facet scanning projector of small mass and radius projects over a 120° sector onto triangular elemental mirror scanners causing the node of the image of the projection lens to sweep a large radius about the projector center. From the scanner the sweeping optical axis of the projector passes through the rotation axis where the picture is imaged onto a concentric semi-specular screen. Three vertical concentrically moving aerial viewing slits are generated 120° apart and at one-third screen radius and rotate in the same direction as the scanning projector node image giving a picture repetition rate of 48 Hz. The audience views the stereoscopic picture as constructed of vertical slices of several pictures generated from the horizontally moving vertical aerial slits.

2 Claims, 26 Drawing Figures

STEREOSCOPIC MOTION PICTURE LARGE SCALE SCANNING REPRODUCTION METHOD AND APPARATUS

CROSS-REFERENCES TO RELATED APPLICATIONS

With reference to my U.S. Pat. No. 4,089,597 of May 16, 1978, my new invention is significantly dirrerent. U.S. Pat. No. 4,089,597 describes a scan projection system requiring a relatively large real horizontal projection angle and an aerial slit locus convexed to the observers and on nearly the same radius as the scan-projector's effective projection lens node. This geometry tends to prevent the expansion of the projection equipment to encompass a full theatre size seating hundreds of people. My new invention, circumvents these restrictions by using a small central scan projector that projects a relatively narrow angle unto an arc array of small rotating triangular mirrors synchronized together and to the scan projector to bring optically generated wide viewing angle screen reflected light to an aerial slit locus concaved to the observers and at a radius about one-third the radius of the scan projector's effective projection lens node image in the triangular mirror scanner. In U.S. Pat. No. 4,089,597, the observers were generally on the outside of the circular scan locus generated by the scan projector's effective projection lens node. In my new invention, the observers are generally on the inside of the circular scan locus generated by the scan projector's effective projection lens node image.

With reference to my patent application Ser. No. 878,990 filed Feb. 17, 1978, my new invention is significantly different. In Ser. No. 878,990 a scan projector with a very wide horizontal angle of projection rotates in a circular locus having a radius of about one-third that of the semi-specular and concentric projection screen. In addition, the projector projects radially away from the central rotation axis of the projector and directly onto the viewing screen. In my new invention, the scan projector projects radially away from the central rotation axis of the projector and onto a circular arc of rotating and synchronized elemental scanning triangular mirrors. The projection rays reflect from the arc of triangular mirrors and pass to the concentric viewing screen located on the opposite side of the rotation axis. Consequently patent application Ser. No. 878,990 converts a wide projection angle into a view angle at the aerial slit of about one-third the projection angle, while my new invention converts a narrow projection angle to a viewing angle at the aerial slit of about three times the projection angle.

BRIEF SUMMARY OF THE INVENTION

The addition of dimensions to the existing visual art of motion pictures has been the subject of inventive pursuit for some time. It is generally recognized that the mind must perceive a change in perspective corresponding to what the left and right eye would normally perceive while looking at any scene. The most obvious means is to take two pictures from displaced camera positions and combine these through some sort of separating mechanism at the eye's position. This technique only provides a single point in the theatre where the view angle equals the original camera view angle and correct visual effects are perceived. The mind tends to compensate for both horizontal and vertical keystone distortion and other viewing anomallies prevalent in this approach. Other approaches to 3-D still utilize two pictures and eliminate glasses but segregate the views at the screen by forcing observers into a zoned area with a ±1.5 inch horizontal tolerance with resultant fatigue. When an observer moves out of a stereo zone, he enters a dark zone or generally a pseudoscopic zone where left and right eye pictures are sent to right and left eyes, respectively. Other attempts at 3-D tend to improve the viewing qualities by interjecting more pictures than the single stereo pair and this tends to broaden the stereo horizontal view field. However, even this scheme results in outer-fringe areas at some horizontal viewing angle in which the stereo view is changed into a pseudo view. Also, the multiple picture systems to date have generally required extra projectors with all of their attendant disadvantages, or small pictures with poor resolution and low light levels.

My invention is a practicable one in which a standard motion picture camera is used to photograph the scene. The camera is not modified in any way and is held in the same manner as for normal 2-D motion pictures. The only requisite is that there be a relative motion between the camera and the scene. The camera or the scene should have a lateral component of motion. The rate of change in lateral positioning of objects in the scene with respect to the film frame only changes the stereo base and consequently the resultant apparent width, height and depth of the scene. A rapid change in the stereo base results in dwarf images and a slow change in the stereo base results in giant images. In the case of dwarf images, the images of objects appear smaller than the original object as on a puppet stage. In the case of giant images, the images of objects appear larger than the original object in size. The results are not unlike a balloon being inflated. There are an infinite number of sizes possible. A horizontal velocity corresponding to a few inches per second results in objects taking on the appearance of normal size found in reality. Zoom effects can also be applied.

Millions of feet of appropriate scenes from the motion picture archives can be directly played or edited for adaptation to the stereoscopic motion picture process described in this specification. The observer will be given a startling sense of reality from the original film flat picture recording.

The nature of my invention is such that if the theatre projector's film transit were stopped while the lamp remained on and any member of the audience were to walk along the back of the auditorium from one side to the other while looking at, for instance, a forest scene with trees at various locations in depth, he would be seeing around the trees with correctly changing perspective and never passing through a pseudoscopic or dark viewing zone along his path.

I have found that by presenting a relatively large number of related images of the scene to be viewed behind a rapidly moving vertical aerial exit slit (optically generated), the parallax thus occurring prevents one eye of each observer from seeing what the other eye sees at any and every instant of time. The aerial aperture being in motion, each eye sees a complete image within a short interval of time. I make this interval within the persistance of vision for human observers. The brain fuses the two eye observations into a single stereoscopic view image; as my practical results predicate.

Accordingly, I am able to present a stereoscopic view of a scene to one or any reasonable number of viewers. If any or all of the viewers walk around or within my apparatus they will see the scene in different aspect, just as though they walked around the same scene in real life.

Considering my system in greater detail, the perspective that one eye of any observer sees is made up of discrete vertical lines of image information taken at discrete instants of time. At these same instants of time the other eye of that observer sees a completely different perspective. The net perspective for the two eyes is different, of course, because the eyes are not coincident in space, but are spaced apart horizontally, as is well known. Considering the image as an entity, it is dissected in time and in space.

An object of my invention is to provide viewing of three dimensional images without the use of viewing aids at the eyes of the observer.

Another object is to provide a stereoscopic system in which various perspectives of the scene viewed may be obtained by changing one's position around the reproducing apparatus.

Another object is to provide a stereoscopic system in which various perspectives of the scene viewed may be obtained by changing one's position within the surrounding reproducing apparatus.

Another object is to provide a basic stereoscopic motion picture method applicable to known and existing forms of image acquiring processes.

Another object is to provide means for reproducing stereoscopic images that are relatively rugged and are suited to retain adjustments in practice.

Other objects will become apparent upon reading the following detailed specification and upon examining the accompanying drawings, in which are set forth by way of illustration and example certain embodiments of my invention.

BRIEF DESCRIPTION OF ALL DRAWINGS

DETAILED DESCRIPTION OF DRAWINGS

Figure 1:
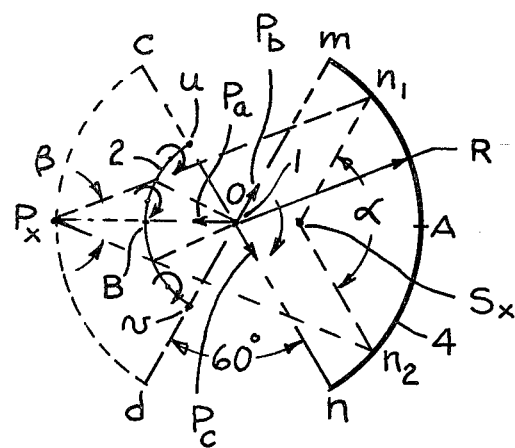
FIG. 1 shows a simplified plan view of the essential elements of the stereoscopic motion picture theatre projection system according to my invention.

FIG. 1 shows a simplified plan view of the essential elements of the stereoscopic motion picture theatre projection system according to my invention. At the center O, a 3-facet projector 1 made of scanning arms $P_a$, $P_b$ and $P_c$ (described in detail in FIG. 23 and FIG. 24) scans a number of successive frames of motion picture film 20 of FIG. 23 arranged in a concentric circular arc mn of FIG. 23 and in a horizontal plane. The relatively small diameter scanning projector 1 of FIG. 1 rotates at 16 r/s in order to have a 48 Hz picture refresh rate due to the sequential scanning of the three arms of projector 1 of FIG. 1 in order to exceed the critical fusion frequency of the observers and avoid flicker. The sweeping pictures are intercepted by scanner 2 (described in detail in FIG. 13, FIG. 14, FIG. 15 and FIG. 16) and represented by arc uBv in FIG. 1. Scanner 2 images the projector's lens node at $P_x$ on scan circle 3 which follows arc $cP_xd$. $P_x$ throws pictures (having their optical axes passing through scan axis O) onto semi-specular concentric screen 4 represented by arc mAn in FIG. 1. The property of screen 4 is to horizontally reflect (as a mirror) and to vertically scatter light incident upon it anywhere on its surface. A practicable surface for screen 4 is horizontally brushed stainless steel. In FIG. 1, projection angle $\beta$ subtended at $P_x$ converts into angle $\alpha$ at "aerial" slit $S_x$ after reflection from screen 4. Angle $\alpha$ equals $3\beta$. Aerial slit $S_x$ moves in a concentric arc about O at approximately one-third screen 4 radius and always remains in-line with $P_x$ and O. The audience will generally be seated to the rear of aerial slit $S_x$ although may be in front of it as well.

Figure 2:
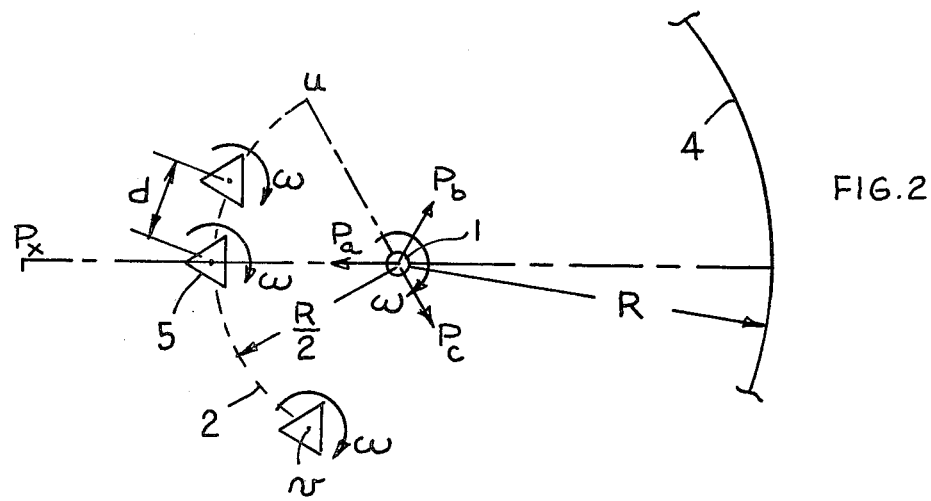
FIG. 2 shows a simplified and exaggerated plan view of the central three facet scan projector, the arc of rotating triangular mirrors in the scanner and the cylindrical projection screen according to my invention.
Figure 3:
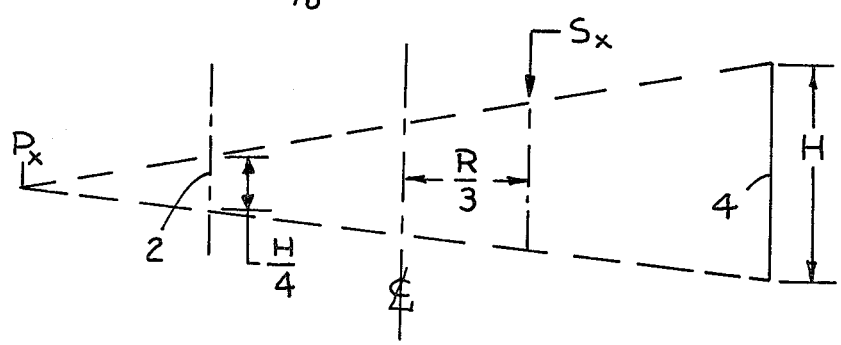
FIG. 3 shows a side elevation of the apparatus described in FIG. 2.

A more detailed view of the scanning system is shown in FIG. 2 and FIG. 3. FIG. 2 shows a plan view of scanner 2 in relation to projection screen 4 of radius R and the scanning central projector at O. In FIG. 2 the central rotating 3-facet projector 1 having scanning arms $P_a$, $P_b$ and $P_c$ and the 3 sided mirrors 5 on scanning arc 2, are rotating about parallel vertical axes at the same angular velocity $\omega$ (16 r/s) and in the same direction. Relative phase accuracy requirements will be described later. Triangular rotating mirrors 5 have a height equal to one-fourth of the viewing screen 4 height H as shown in FIG. 3. The arc length encompassing the total array of multiple triangular mirrors 5 is one-half of the screen 4 arc width for a screen arc of 120°. This arc will be increased to two thirds of the screen arc to accomodate the projected ray bundle and this feature is more fully discussed later in this specification. Triangular mirrors 5 need not be very small but size constraints based on spherical aberration correction and aerodynamics will be discussed later in this specification.

In the scan sequence as depicted in FIG. 1 and FIG. 2 the projector 1 optical axis is always pointed directly into and normal to one of the triangle mirror 5 facets. This feature tends to equate the imaging characteristics of this system for any scan angle.

Figure 4:
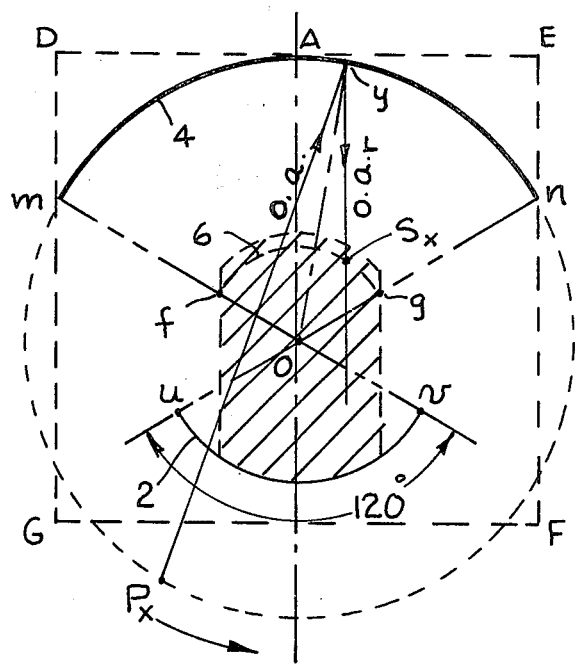
FIG. 4 shows a plan view of the stereoscopic motion picture theatre with shaded audience area, projector, scanner, screen and depicting precession of the original camera's optical axis in the scan projector for parallel tracking of the reflected optical axis, according to my invention.

FIG. 4 shows a plan view of the theatre with the approximate location of the audience (shaded) and the limits of the theatre building DEFG. The scanning locus of projector node image $P_x$ is outside the theatre walls. For the position of $P_x$ (as shown in FIG. 4 along the scan circle), the original camera's optical axis o.a. (or center of the picture frame on the film) must be directed toward y on screen 4 arc mAn in order that the reflected optical axis o.a.$_r$ of the original camera remains parallel to OA. This effect tends to duplicate the photography process of FIG. 5 where the optical axis o.a. of camera 11 in successive views remained essentially parallel. Note that the normal to screen 4 is shown as oy and the reflected o.a.$_r$ intersects the circular aerial slit locus arc 6 at the "aerial" slit $S_x$. Arc 6 encompasses points f, $S_x$ and g. When $P_x$ is in-line with OA there is no off-set required in the original camera's optical axis o.a. as projected. Therefore some sort of "optical axis precession" is required to compensate for the standard manner in which the pictures were photographed. The implementation of precession is quite simple and natural in the projection system and the means to accomplish this feature will be described in some detail later in this specification.

As in FIG. 1 and FIG. 2, the theatre projection system provides a central low mass and low inertia scan-projector 1 and fixed scanner 2 with synchronized elemental rotating mirrors 5; a relatively small angle projection bundle $\beta$ and a more centralized audience (shown by the shaded area of FIG. 4) to allow greater audience involvement with action in the scene.

Figure 5:
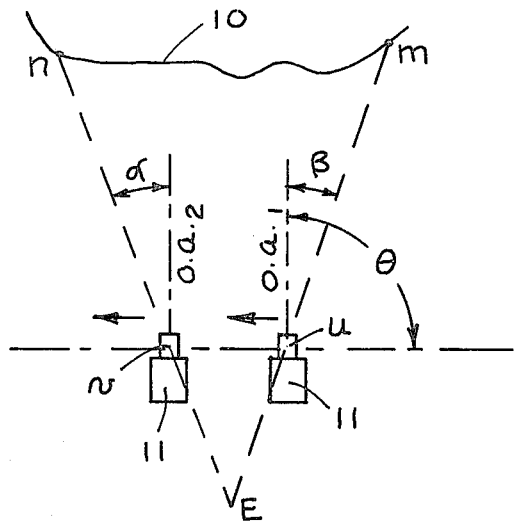
FIG. 5 shows a plan view of a principle of photography used to acquire the successive laterally changing images scanned by the scan projection system according to my invention.
Figure 6:
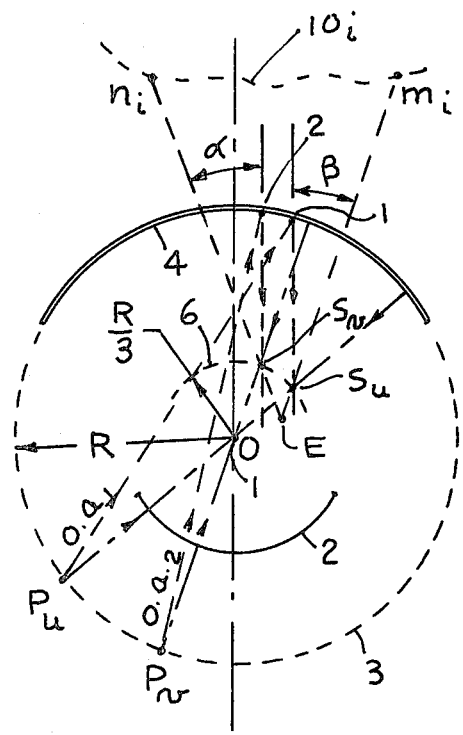
FIG. 6 shows a plan view of the threatre projection and viewing geometry as applied to image reconstruction for an arbitrary eye position within the theatre according to my invention.

FIG. 5 and FIG. 6 show photography and projection principles involving two points (m and n) on an arbitrary scene 10 or corresponding image points $m_i$ and $n_i$ on scene image $10_i$ and an eye E located somewhere in the scene and theatre in relation to the objects and images of m and n. In FIG. 5, the photographing camera 11 is moving to the left from u to v while photographing scene 10. The optical axes o.a.$_1$ and o.a.$_2$ are shown parallel to each other and normal to the path line from u to v. Camera 11 positioning is flexible and the angle $\theta$ may be varied so that scenes may be photographed anywhere in a hemisphere. In general, however, optical axes o.a.$_1$ and o.a.$_2$ remain close to parallel between successive images on the motion picture film. An imaginary line is drawn from the two object points m and n on scene 10 in FIG. 5 and extended back to an imaginary point E which has the same relative position to eye E in the theatre reproduction of FIG. 6 with respect to image points $m_i$ and $n_i$.

In FIG. 6, all of the basic elements of the total theatre projection system are shown. Projection points $P_u$ and $P_v$ are to represent points along projection image scan path 3 which when transferred to aerial exit slit locus 6 points $S_u$ and $S_v$, represent the points u and v in the photography of the scene of FIG. 5. Precession of the originally photographed picture optical axes o.a.$_1$ and o.a.$_2$ is required in FIG. 6 to reconstruct the original optical axis parallelism as in FIG. 5. It should also be noted that angles $\alpha$ and $\beta$ are essentially duplicated in both photography and reproduction. $P_u$ projects its picture frame center (original camera u o.a.$_1$) to 1 on screen 4 where it reflects parallel to OA through $S_u$ and the eye sees $m_i$ at angle $\beta$ to the right of the reflected o.a.$_1$. $P_v$ projects its picture frame center (original camera v o.a.$_2$) to 2 on screen 4 where it reflects parallel to OA through $S_v$ and the eye sees $n_i$ at angle $\alpha$ to the left of the reflected o.a.$_2$. The total horizontal projection angle leaving $P_u$ or $P_v$ will be somewhere between $\pm 15$ or $\pm 20$ degrees about the line drawn through projection scan center O in FIG. 6. All of the rays leaving $P_u$ or $P_v$ will approximately intersect the corresponding aerial slit positions $S_u$ or $S_v$ respectively. The tendency for on-axis and off-axis rays to not precisely converge at the designated aerial slit, is due to spherical aberration in the geometry. Spherical aberration correction will be discussed later in this specification.

The arbitrary nature of the construction in photography and viewing geometry between FIG. 5 and FIG. 6 should cover any eye position or image points in the scene and should suffice to show that all original scene object points will appear in their relative spatial locations in the reproduction and that eyes will be forced to see proper sections of the original scene refreshed at 48 Hz regardless of the eye position in the theatre.

Photography by fixed motion picture camera and translating scene or fixed camera and scene rotating on a turntable, are also adaptable to reproduction in the stereoscopic motion picture theatre described in this specification. These alternate photographic methods are described in detail in my U.S. Pat. No. 4,089,597 issued May 16, 1978.

Figure 7:
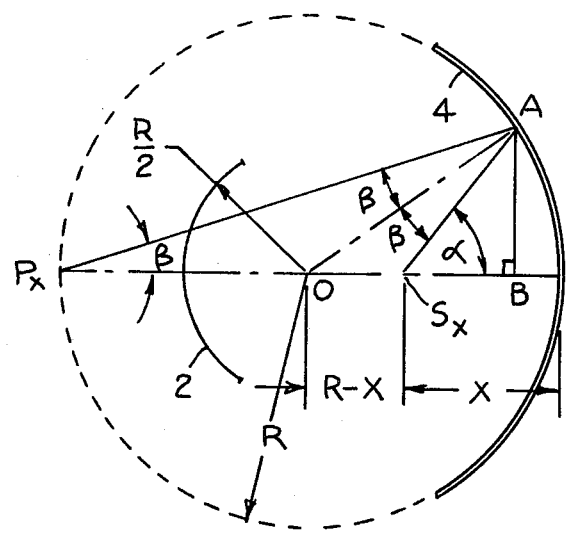
FIG. 7 shows a plan view of parametric relationships for a form of theatre projection geometry according to my invention.

One of the requisites for a scanning geometry that must remain of constant properties over a large scanning angle (i.e. 120 degrees), is that a concentric right circular cylinder shape be employed for both scanner 2 and screen 4 of FIG. 7. As shown previously in FIG. 1, scanning projection mode image $P_x$ should be contained in the same scan circle 3 which also contains semi-specular screen 4. Projector 1 must be at or near center O of scan circle 3 in order to reduce the projector's inertia and to provide the basis for a concentric and enlarged scan circle 3 by reflection of projector 1 rays from scanner 2.

FIG. 7 shows a geometric construction for proving that one-half of the horizontal projection angle (i.e. $\beta$) is multiplied by exactly 3 at exit "aerial" slit $S_x$. It can be shown that $\alpha = 3\beta$ in FIG. 7. FIG. 7 also provides the geometry for calculation of the position of aerial slit $S_x$ for near axis $P_xB$ and off-axis $P_xA$ rays. From the geometry, it can be shown that;

$$x = \frac{R[\sin 3\beta - \sin\beta]}{\sin 3\beta}$$

Table 1 below, lists changing values of x in terms of R based on one-half the projection angle $\beta$ corresponding to the parameters as depicted in FIG. 7.

Table 1

| | Tabulation of Aerial Slit Location (x) based on ½ Projection angle $\beta$. (Ref. FIG. 7) | |
|---|---|---|
| $\beta$ | x | % deviation from $\beta = 0°$ |
| 0 | ⅔ R | 0 |
| .5 | .668R | 0 |
| 2 | .666R | 0 |
| 5 | .663R | 0.4 |
| 7.5 | .659R | 1.0 |
| 10 | .653R | 2.0 |
| 15 | .634R | 5.0 |
| 20 | .605R | 9.0 |

From table 1, it is seen that aerial slit $S_x$ in FIG. 7 moves away from the circle center O as the angle $\beta$ is increased. In the discussion involving Scanner Mathematics from FIG. 14 (to be described later) an automatic correction occurs that tends to keep aerial slit $S_x$ closer to its assigned location for all angles of $\beta$. The required accuracy of returning projected rays to aerial slit $S_x$ has not been conclusively determined. Preliminary testing on a smaller model was indicated that exact slit convergence is not a strict requirement. A detailed discussion involving a theoretical solution to spherical aberration in the formation of aerial slit $S_x$ is included in this specification in reference to FIG. 17 and will be discussed later.

It has been shown in FIG. 5 and FIG. 6 that the optical axes $o.a._1$ and $o.a._2$ in the photography of scene 10 and in the reproduction of scene $10_i$ are essentially parallel. Since the pictures are projected, as in FIG. 7, with the center of the projection bundle always directed through the circle center O, if the original optical axis position of the camera (represented by the center of the motion picture frame) were directed through projection center O, the reflected optical axis from screen 4 in the reproduction would be radial rather than parallel to line OB in FIG. 7. Therefore as shown in FIG. 6, an off-set was required in the center of subsequent picture frames as the optical axis from the scan projector's virtual image (represented by $P_v$ and $P_u$ in FIG. 6) leaves the center screen position A while the projector's image is in transit along scan locus 3, in order that the reflected optical axis $2S_v$ or $1S_u$ will remain parallel and coincident with the moving aerial slit position represented by $S_v$ and $S_u$ of FIG. 6 along locus 6.

Figure 8:
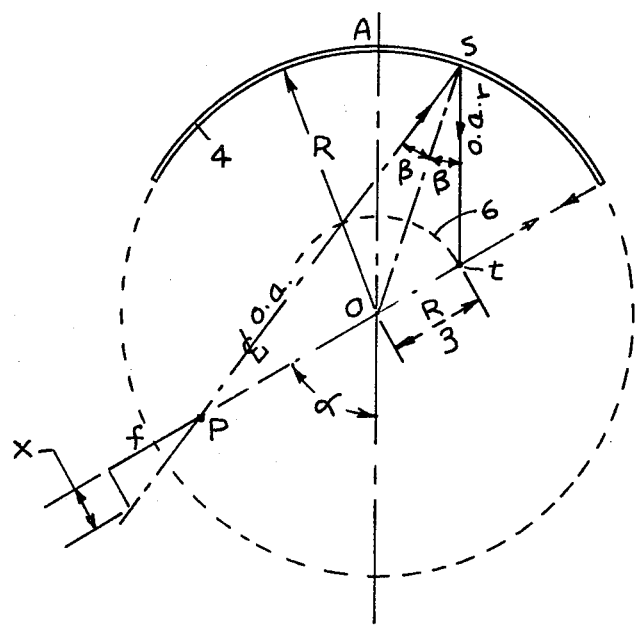
FIG. 8 shows a plan view for a geometric construction required to establish the progressive off-set dimension x for the original camera's optical axis with respect to the scan projector's optical axis according to my invention.

FIG. 8 shows the geometry to determine optical axis off-set x (i.e. shift in the picture frame center as measured on the film) as a function of $\alpha$ (i.e. one-half the total scan angle). An off-axis ray containing the camera's optical axis o.a. is projected toward s on screen 4. The reflected optical axis $o.a._r$ intersects aerial slit locus 6 at t in FIG. 8. Line st is parallel to reference line OA. It can be shown mathematically that the required picture shift $$x = f \tan\left[\alpha - 2\sin^{-1}\frac{\sin\alpha}{3}\right].$$

This formula shows that there is no required film frame shift at $\alpha = 0$ and that the film frame required shift at the maximum angle of $\alpha = 60°$ is 0.497f where f=focal length of the projection lens. Since correction for spherical aberration has not yet been described, the position for the projector image has moved inward from the scan circle 3 in order to satisfy the geometry of FIG. 8.

Figure 20:
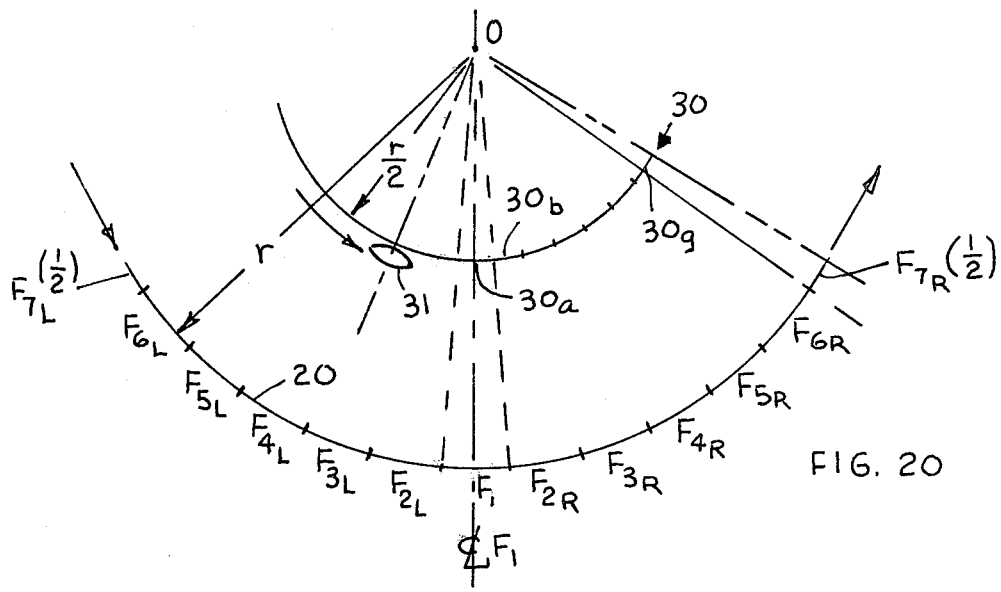
FIG. 20 shows a plan view of a portion of an embodiment of the three facet scan projector showing a single facet of scan optics and the mirror segment image motion compensator with built-in precession of the original camera's optical axis with respect to the scan projector's optical axis according to my invention.
Figure 21:
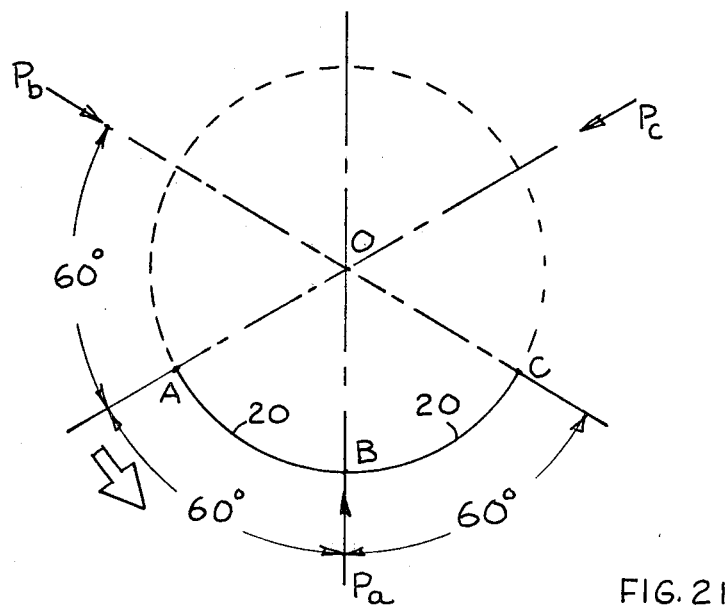
FIG. 21 shows a simplified plan view of the embodiment of the three facet scan projector of FIG. 20 while showing all three facets in relation to the scanned film arc for the purpose of intermittent motion timing in mirror segment motion compensation.
Figure 22:
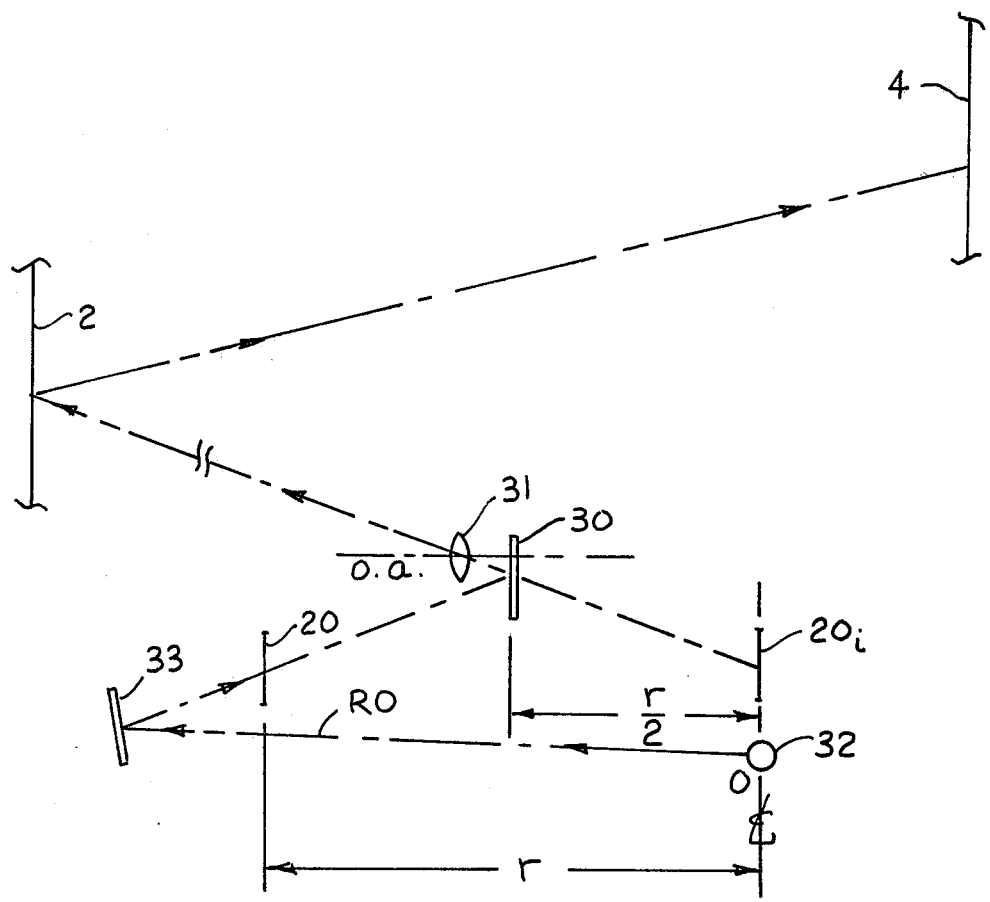
FIG. 22 shows a side elevation of the embodiment of the three facet scan projector shown in FIG. 20 and FIG. 21.
Figure 23:
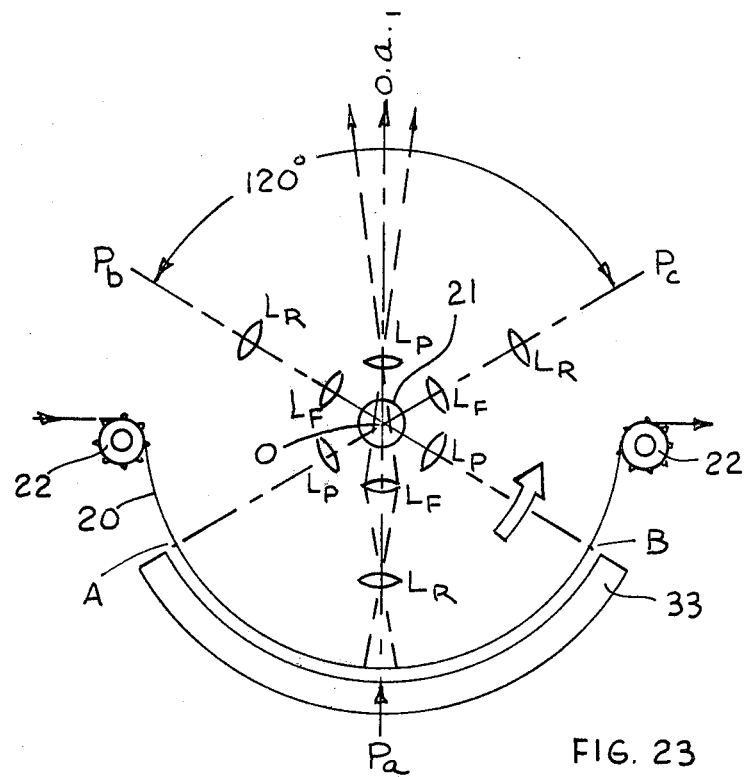
FIG. 23 shows a simplified plan view of an embodiment of the three facet scan projector using a central multifacet polygon prism image motion compensator according to my invention.
Figure 24:
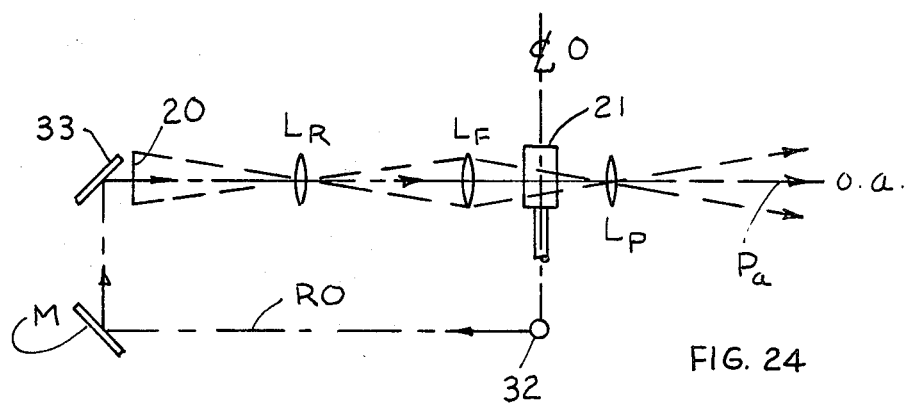
FIG. 24 shows a simplified side elevation of the three facet scan projector shown in FIG. 23.

Two types of projector concepts will be discussed in some detail later in this specification (mirror drum; FIG. 20, FIG. 21 and FIG. 22 and polygon prism; FIG. 23 and FIG. 24). However in order to describe the means to implement "optical axis precession", a rotary prism type projector will be briefly introduced at this point.

Since a triangular shaped elemental mirror scanner 5 of FIG. 2 offers the best approach toward obtaining a continuous picture without black gaps between the elemental rotating mirrors and the scan angle is 120 degrees, a centralized scanning projector 1 containing three projection arms ($P_a$, $P_b$ and $P_c$— each separated from the other by 120° as shown in FIG. 1) was required. Each of the 3-facets must be accurately aligned (not unlike the need to align the projection optics of 3 additive projectors for reconstruction of a full color picture). Each of the facets must cause a repeat scan to occur every 1/48 second to avoid flicker.

Figure 9:
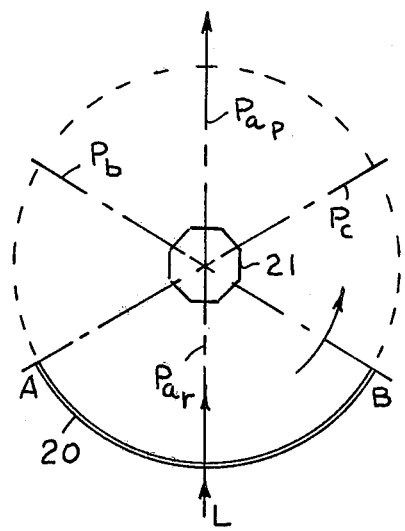
FIG. 9 shows a simplified plan view of a scan projector using three identical sets of scan optics and a central polygon prism image motion stabilizer according to one embodiment of my invention.
Figure 10:
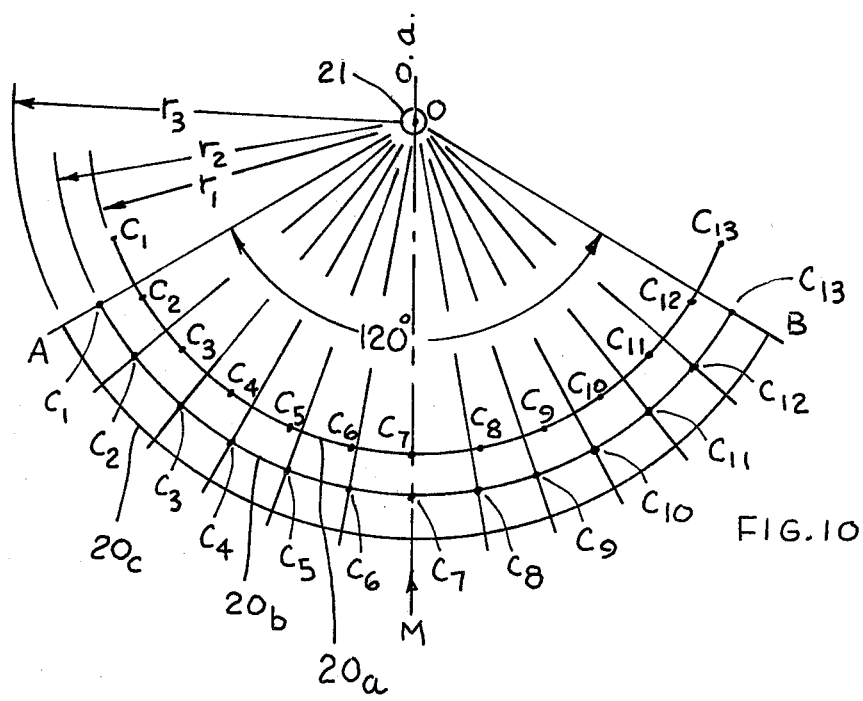
FIG. 10 shows how the radius of the scanned film arc is varied in the embodiment of FIG. 9 to cause the required precession of the original camera's optical axis with respect to the scan projector's optical axis according to my invention.

In FIG. 9, the motion picture film 20 to be scanned is placed in a horizontal plane and configured into a circular shape (covering 120°) which is concentric about the projector's vertical scan axis O. The frame to frame separation and the number of frames determined for 120° of the arc have a relationship to determine how the frame-center will be placed with respect to the centerline of the scanning projector. In FIG. 10, by placing the arc of film 20 either closer to the center 20a or further from the center 20c than the "matched" point 20b (i.e. that place where the original camera's optical axis would be radially projected at all times), precession of the optical axis o.a. can be invoked in either direction on the screen. Precession will take the direction shown in FIG. 6.

FIG. 9 shows a simplified scan projector 1 with 3-facets ($P_a$, $P_b$ and $P_c$) having a central rotating polygon prism 21 and a 120° arc of film 20. This combination will provide for the scanning of all precess arranged film frames having the projector's optical axis directed toward the center of rotation O. Light from a Xenon short arc lamp 32 of FIG. 24 at scan center O and below film 20, is directed through the film arc AB at L in FIG. 9 and toward polygon prism 21 via relay optics $P_{ar}$. Projection optics $P_{ap}$ on the opposite side of prism 21 send the projected picture to the triangular mirror scanner 2 of FIG. 1. The 3-arm scanner 1 of FIG. 9 and FIG. 1 is caused to rotate in sync with the triangular mirror scanner 2 of FIG. 1 at 16 r/s.

FIG. 10 shows how film 20 is positioned in arc AB at the proper radius ($r_1$, $R_2$ or $r_3$) to cause the required precession of the individual picture frames on projection screen 4 of FIG. 1 as film arc 20 of FIG. 9 and FIG. 10 is scanned by 3-facet projector 1 of FIG. 1. Points $C_1$ through $C_{13}$ in FIG. 10 represent a centroid location on sequential scene frames which is coincident with the position of the original camera's optical axis at the time the frame was photographed. Although only 13 frames are shown for convenience, calculations show that this number rises to somewhere between 116 and 258 for the 120° film arc 20 depending on whether the audience size is 100-200 or 500-1000 people, respectively. In FIG. 10, scan center O is shown with 13 radial lines extending out to the 13 adjacent film frames in the 120° film arc 20 at position 20b. Point 20b is the "matched projection point". If film 20 remained at position 20b, the reflected optical axis $yS_x$ of FIG. 4 in the viewing of the scene would remain radial instead of parallel to reference line OA as requirements dictate. In order to allow for a precession of the optical axis with respect to the scan angle on either side of the zero axis MO shown in FIG. 10, film arc 20 is positioned at either position 20a or position 20c (determined by the total optical system). This technique for optical axis precession is then a very simple and practicable approach to achieve the desired results. In FIG. 10, $C_2 - C_1 = C_3 - C_2 = C_4 - C_3$, etc. By shifting film arc 20 from position 20b to position 20a, the individual motion picture frame center only lines up with the optical axis at $C_7$ and is either to the right or to the left for those frames projected toward extremities.

In determining the proper ratio between scanning projector 1 of FIG. 1 carrying the three lens assemblies ($P_a$, $P_b$ and $P_c$) and central rotating prism 21 of FIG. 9 with multi-facets, the following is suggested with reference to FIG. 9 and FIG. 10.

1. Start with projection arm $P_a$ at zero position MO which aligns with picture frame center $C_7$. At this point, a facet of prism 21 is normal to optical axis LO of FIG. 9.

2. Rotate the arm 120° to projection arm $P_b$ and the same condition will exist (however, another prism 21 facet could be involved as a new prism 21 facet is utilized for each of the film frames $C_1$ through $C_{13}$).

3. Items 1 and 2 should prevail whether film 20 is in motion or stationary.

4. The size of film 20 arc AB must first satisfy the 120° scan requirements for a given theatre size (the minimum quantity of frames to allow this is described later in this specification and is indicated in step 5).

5. Movement of film 20 driven by sprocket 22 of FIG. 23 and in a circular arc AB about scan axis O, must result in polygon prism 21 angular velocity change equal (and in the same direction) to the film angular velocity about scan axis O. This angular velocity is superimposed upon the high spin rate of polygon prism 21 which must handle between 116 and 258 pictures in the 120° film arc 20 within 1/48 second. A 16 facet prism 21 would then spin at a rate between 348 and 774 r/s respectively. This is quite realistic. The inventor has spun projection prisms in excess of 475 r/s with no problems.

6. Determine a gear ratio (or timing belt ratio) that causes prism 21 to rotate one facet when the projection arm ($P_a$, $P_b$ or $P_c$) rotates between two adjacent frame centers such as $C_4$ and $C_5$ on film arc 20 of FIG. 9 and FIG. 10. This approximates the required geometry.

The above 6 steps constitute one approach for setting up proper rotating member relationships in scan projector 1 of FIG. 1.

In a standard theatre where an image is projected onto a reflective screen, each point of the screen where the light falls scatters the light in some particular horizontal and vertical pattern (depending on the screen gain characteristics in X and Y). The observer's eye therefore can be placed anywhere in the theatre where sufficient and uniform light is received by the eye from all screen elements illuminated by light from the projected frame.

In the stereoscopic motion picture system being described in this specification, it can be first assumed that the vertical scatter of light from screen 4 of FIG. 1 is sufficient to encompass all of the observers anywhere in the auditorium seating space. To provide light outside of this area is to waste light. In consideration of light received by the observer through the horizontal component of projected light by screen 4 reflection, the observer's eye must be in-line with the projected light (as reflected from screen 4) and aerial slit $S_x$ of FIG. 1. Therefore, a maximum angle subtended at aerial slit $S_x$ by the picture reflected from the screen is desired for a large audience relative to screen radius R of FIG. 2. For screen radii varying from 34 to 76 feet, the audience size varies from 100-200 or 500-1000 people.

Figure 11:
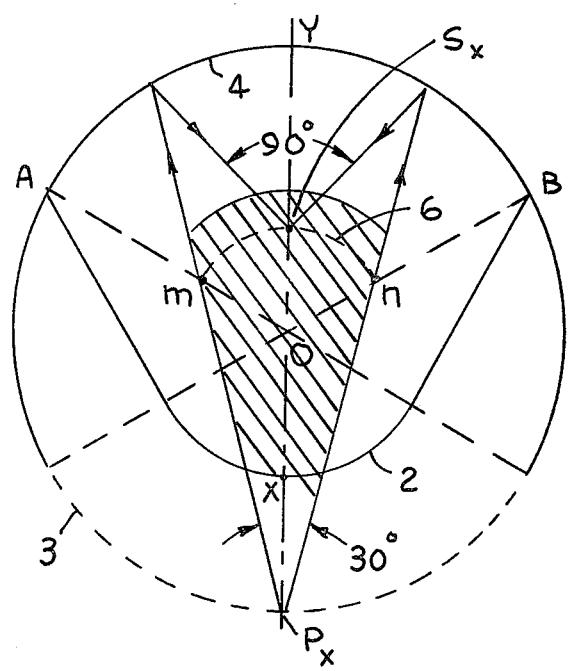
FIG. 11 shows a simplified plan view of a stereoscopic theatre seating arrangement for a 30 degree projection angle and a corresponding 90 degree audience viewing angle according to my invention.
Figure 12:
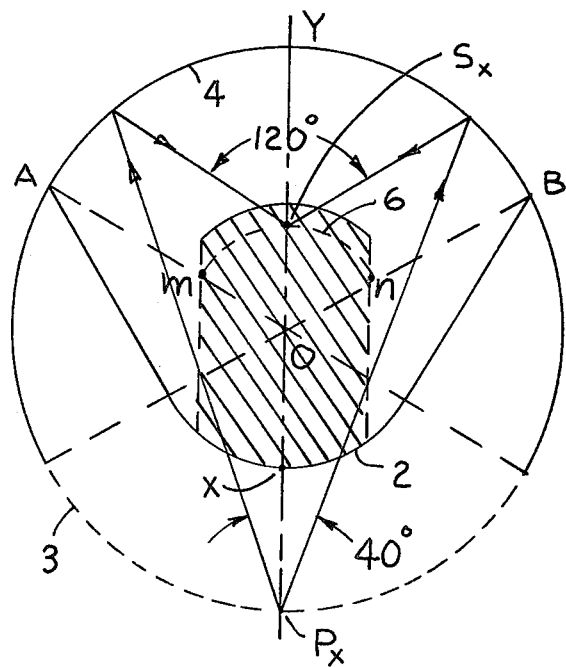
FIG. 12 shows the same picture as for FIG. 11 except for a 40 degree projection angle and a corresponding 120 degree audience viewing angle according to my invention.

FIG. 11 and FIG. 12 show the suggested audience area (shaded) for a 30 degree and a 40 degree projection angle, respectively. This area is designated as places where an eye can be located and see a relatively large picture through the horizontally moving vertical aerial slit $S_x$ and from illuminated screen 4. The observer's eye receives information for constructing the 3-D picture from available vertical interstices as seen through aerial slit $S_x$. Several positions exist outside of the shaded area where part of aerial slit $S_x$ (within aerial slit locus 6 over arc mn) is backed up by screen 4 light and so the audience outside of the shaded area would still see portions of screen AB. In both FIG. 11 and FIG. 12, the audience is extended slightly forward of aerial slit locus 6 as stereoscopic information is perceived by the eyes of either side of aerial slit $S_x$. The shaded audience area in FIG. 12 with the 40 degree projection angle, is considerably increased in size compared with the 30 degree projection of FIG. 11.

FIG. 1, FIG. 2 and FIG. 3 showed briefly the need for scanner 2 as applied to the total theatre 3-D movie system. Scanner 2 provides the means by which the centrally located relatively low inertia, low mass and small radius three facet scan projector 1 (rotating at 16 r/s) can be imaged at approximately radius R so that projector 1 image $P_x$ "effectively" rotates at 16 r/s about scan projector axis O. The advantage of scanner 2 is to prevent the use of a large rotating apparatus in the theatre. Scanner 2 itself is not without rotating elements, but taken as a whole, the device is stationary. The geometry of scanner 2 in its basic form is shown in FIG. 1, FIG. 2 and FIG. 3. Each of the elemental triangular mirror scanners 5 rotate in sync with each other and with 3-facet scan projector 1.

Figure 13:
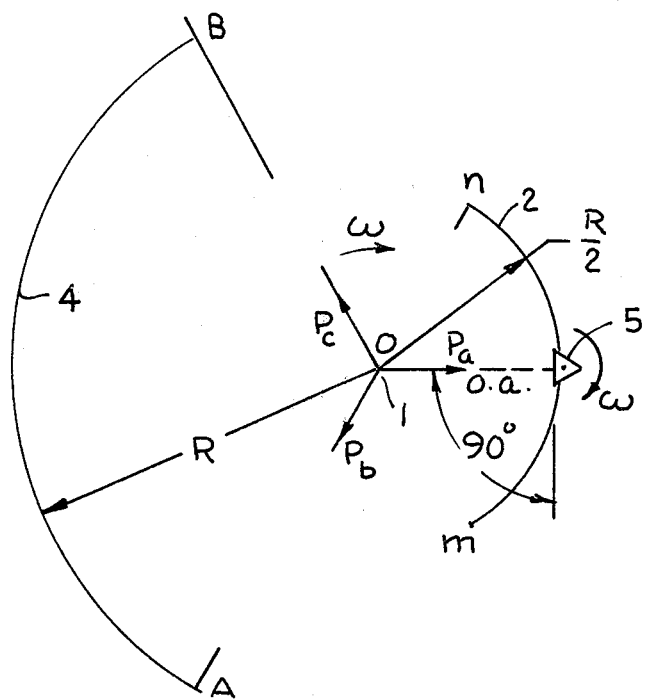
FIG. 13 shows a simplified plan view of the phasing relationship for a triangular mirror on the circular scanner with respect to a facet arm of the three facet scan projector in order to assure a high resolution projected picture on the theatre screen according to my invention.

In FIG. 13, a determination of the phase angle tracking accuracy of both three facet projector 1 and scanner 2 elementary rotating mirrors 5, is required in order to assure a high resolution picture. Projector 1 contains 3 sets of projection optics ($P_a$, $P_b$ and $P_c$). Scanner 2 mirrors 5 contain 3 faces each and both projector 1 and scanner 2 are driven by a synchronous timing linkage (either electronically or mechanically). Ideally, whenever a projector 1 arm $P_a$, $P_b$ or $P_c$ with its corresponding o.a., intersects the centroid of a triangular mirror elemental scanner 5, the projector's o.a. should be normal to the scanning face of the triangular mirror regardless of where along scanner arc 2 (mn) the interception takes place. If it is assumed first, that projector 1 arm $P_a$ is accurate, a calculation can be made to determine the contribution that triangular mirror 5 makes to phase angle errors as a function of screen 4 image shift. If triangle mirror 5 rotates by angle $\theta$, the deviation angle is $2\theta$. The distance between triangle mirror 5 and screen 4 is 3R/2. Therefore the screen image shift would be $3R\theta$ where R is screen 4 radius. Now if it is assumed that triangular scanner 5 is accurate but the 3-facet scan projector 1 inter-arm phase relationship is not precisely 120° apart, another component of image shift at screen 4 can be determined. If projector 1 arm $P_a$ phase angle shift between adjacent projector arms $P_a$, $P_b$ and $P_c$ in FIG. 13 is given as $\beta$, projector 1 image $P_x$ to screen distance is 2R in FIG. 2 and the screen image shift is $2R\beta$. Summing the effects of screen image shift due to both scanner 2 and projector 1, the total possible screen 4 error would be R $(3\theta+2\beta)$. The criteria for picture jitter or resolution between two closely adjacent points, is established from the literature and in practice is 1 minute of arc imageshift (as subtended at the observer's eye). For a given image shift at screen 4, the closest observers at 2R/3 from the screen should be satisfied. The maximum allowed shift is then calculated to be $1.93 \times 10^{-4}$ R (where R has the same units as the screen 4 image shift). For simplicity of calculation, it is also assumed that the phase angle error of scan projector 1 arm $P_a$ equals the phase angle error of triangular mirror 5 on scanner 2. The allowable phase angle is then calculated to be 8.5 seconds of arc. The angular phase tolerance for scan-projector 1 arm $P_a$ is 8.5 seconds and for scanner 2 elemental mirrors 5 is also 8.5 seconds. The shift is independent of screen 4 radius.

Table 1 tabulated the percentage deviation in aerial slit $S_x$ position due to spherical aberration effects for off-axis rays as shown in FIG. 7. The introduction of 120° scanner 2 located at one-half screen 4 radius on the opposite side of axis of rotation O from concentric screen 4 causes a slight improvement in the positioning of aerial slit $S_x$ for off-axis rays. Actually scanner 2 occupies 160° of arc with 120° being the projection optical axis sweep excursion with 20° on either side for one-half projection angle intercept.

Figure 14:
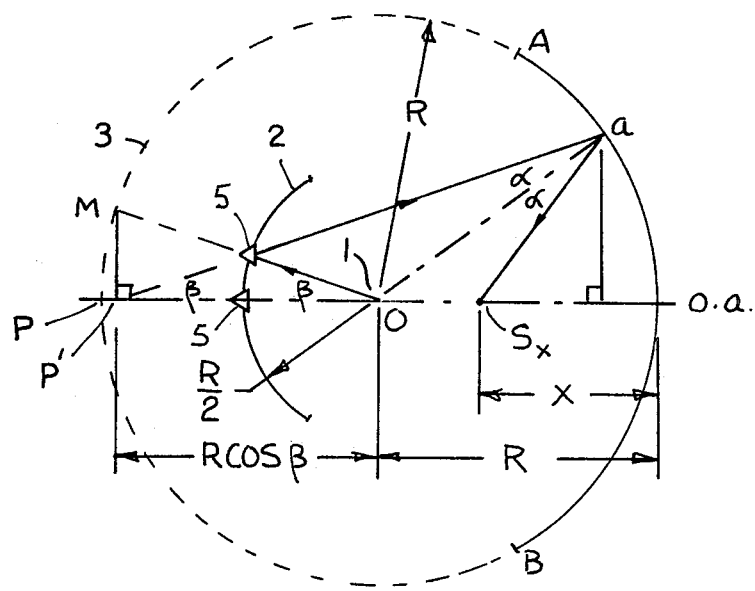
FIG. 14 shows a plan view for a form of projection geometry for scan projector, triangular mirror scanner circular arc and cylindrical screen in order to determine the radius of the aerial slit locus.

FIG. 14 shows the geometric construction for projection via scanner 2 from which certain relationships can be derived to show more consistency for dimension x compared with results tabulated for table 1 above. From FIG. 14, it can be seen that for projection ray OP along optical axis o.a., the image P of projector 1 is on the periphery of scan circle 3 but for ray OM at angle $\beta$ (off-axis rays), the apparent projection node image shifts from along the o.a. to P' (a distance R cos $\beta$ from rotation axis O). This shift is in a direction that tends to bring the reflected screen 4 light from off-axis rays closer to center of rotation O when the tendency is for those rays to move away from center of rotation O when scanner 2 is not employed but where instead, the whole picture is projected from point P of FIG. 14. When x is finally calculated from the geometric layout shown in FIG. 14, x can be expressed in terms of R and $\beta$ in the following formula:

$$x = R\left[1 - \frac{2\cos\beta}{2 - \sin^2 2\beta + 2\cos^2\beta \sqrt{4 - \sin^2 2\beta}}\right]$$

From this equation for x (the location for aerial slit $S_x$ as a function of projection 1 angle $\beta$), a table showing values of x in terms of R can be generated. Table 2 shows x tabulated for values of $\beta$ from zero to 20°. The table also lists the corresponding values of x from table 1 (without scanner 2) for comparison. A very slight improvement is noted, especially for the maximum off-axis ray P'$_a$ of FIG. 14.

Table 2

| | Aerial Slit Positions Using Scanner Compared with no Scanner | |
|---|---|---|
| | x | |
| $\beta°$ | Scanner | No-Scanner |
| 0 | ⅔ R | ⅔ R |
| 7.5 | .66R | .659R |
| 10 | .655R | .653R |
| 15 | .64R | .634R |
| 20 | .619R | .605R |

Figure 15:
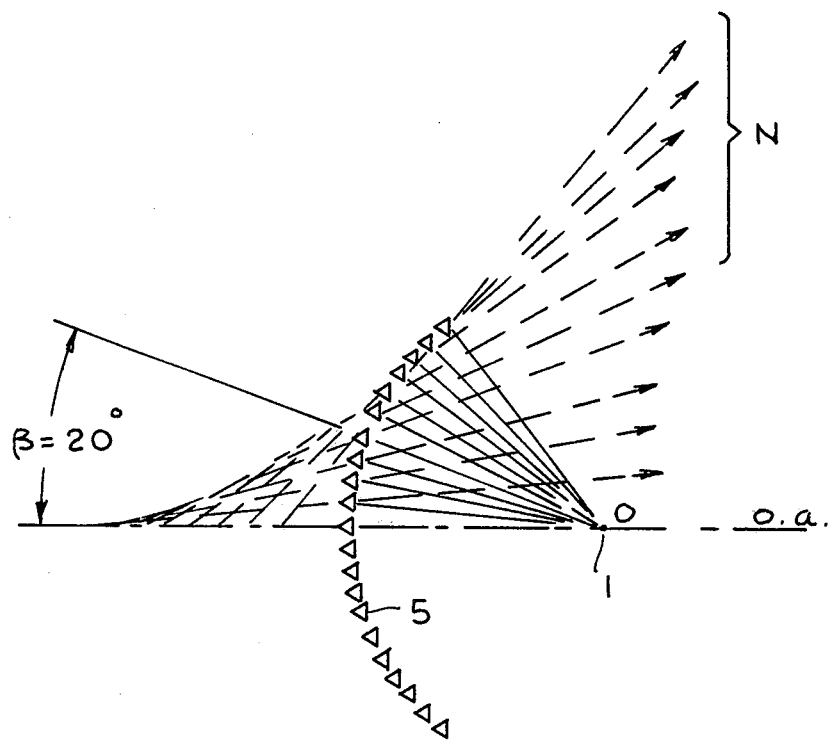
FIG. 15 shows a simplified plan view of the limiting projection rays leaving the circular arc of triangular mirrors in the scanner according to my invention.
Figure 16:
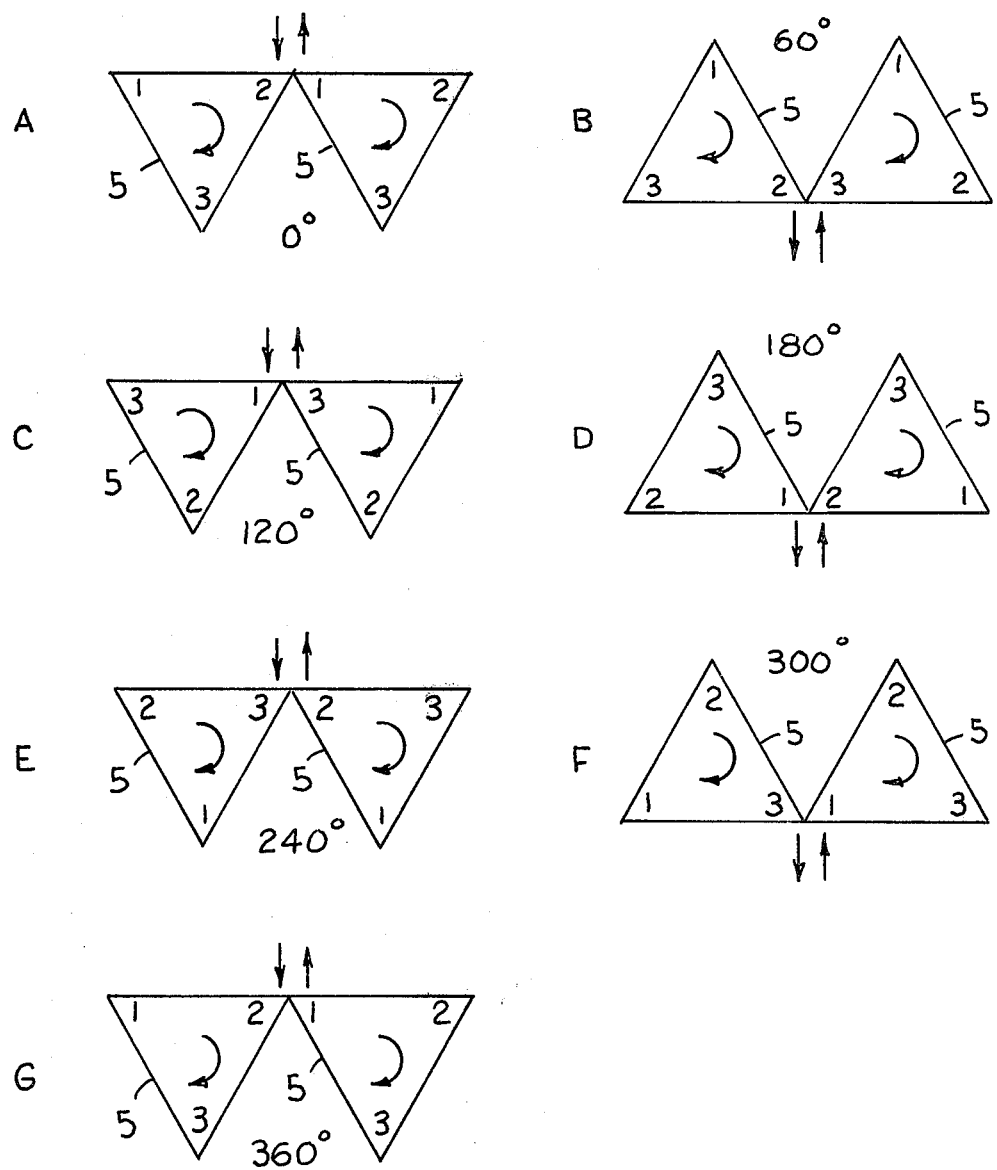
FIG. 16 shows the separation distance and phase relationship for two adjacent triangular mirrors in the scanner arc according to my invention.

The effect of shifting off-axis rays OM of FIG. 14 is shown more dramatically in FIG. 15. If projection 1 half-angle $\beta$ exceeds about 20°, there is an interference (region N) in reflected light from triangular mirrors 5 caused by the circular curve (scanner 2) containing the centroid axis of rotation for adjacent triangle mirrors 5. A 20° half-angle means that a 40° horizontal projection angle corresponds to a 120° horizontal viewing angle subtended at aerial slit $S_x$ of FIG. 14. This is a very ideal arrangement for theatre geometry in expanding the number of viewers with respect to fixed screen 4 radius of FIG. 12. Scanning projector 1 is shown at position O in FIG. 15. The details of projector 1 are shown in FIG. 20, FIG. 21, FIG. 22, FIG. 23 and FIG. 24.

In FIG. 2, in order to project spatially continuous pictures onto projection screen 4 and eliminate the possibility of dark spaces between adjacent vertical picture segments, triangular mirror 5 faces on adjacent triangular mirrors 5 within scanner 2 must come close together. It is found that if mirror triangles 5 are equilateral, the minimum spacing between triangular mirrors 5 equals the length of one side of triangular mirror 5. In order to accomplish reasonably small clearance spacing between adjacent triangular mirrors 5, it is imperative to maintain angular synchronization between adjacent triangles 5 to avoid mechanical interference. If triangles 5 were spaced to avoid corner interference, the spacing would have to exceed the length of an equilateral side by 15 percent which would cause the appearance of severe dark bands between adjacent vertical picture segments. Therefore, for good optical results, it is necessary to make the separation of adjacent triangular mirrors 5 just enough for mechanical clearance.

FIG. 16A through FIG. 16G shows 7 views of two adjacent triangular elemental mirrors 5 in scanner 2 where each successive view is advanced 60° ahead of the preceding view. A model of this structure shows that no interference is incurred as long as the angular phase-lock relationship between two adjacent triangular mirror 5 sets is adhered to. At the juncture point where the corners of two adjacent triangular mirrors 5 meet, the arrows show opposing direction. The angular velocity is 16 r/s.

The inventor would be remiss in not briefly covering a theoretically perfect solution to returning all of the projected rays precisely to aerial slit $S_x$ of FIG. 14. This solution is academic only and its implementation is not presently practicable with state of the art facilities. Should complete elimination of spherical aberration become necessary in order to prevent cross-over of one eye's information into the other eye, the approach shown below may be used as a guide.

Figure 17:
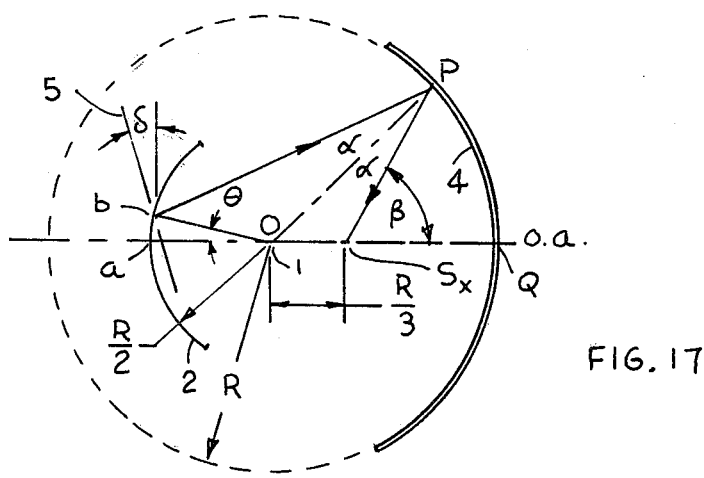
FIG. 17 shows a plan view of the basic projection geometry for ray forcing to correct spherical aberration according to my invention.

FIG. 17 shows the basic geometry of the projection system for forcing all of the projected rays from projector 1 regardless of angle, to aerial slit $S_x$ at radius R/3 after reflection from dynamic scanner 2 and static screen 4. From the geometry of FIG. 17, the following equation is derived:

$$\sin 2(\theta + \delta) = \tfrac{8}{3} \sin \beta$$

It is obvious that a triangular mirror 5 orientation at point a on scanner 2 must be normal to the optical axis o.a. because aerial slit $S_x$ lies on the o.a. However, for point b on scanner 2, the triangular mirror 5 orientation must be at angle $\delta$ with respect to the angle at a, in order to send projected ray Ob to point P on reflective screen 4 surface so that it can precisely return to aerial slit $S_x$. Triangular mirrors 5 in scanner 2 will have to turn faster than projector scanner 1 so that a ray on the projector 1 optical axis will be normal to the triangular mirror 5 facet at the time scan projector 1 optical axis crosses the center of rotation of the triangular mirror 5 at point b. The triangular mirror 5 rotation rate divided by scan projector 1 rotation rate must have the relationship $(\theta + \delta)/\theta$ from FIG. 17. The smallest whole number that this ratio can represent is the number 2. Since there are three projecting facets ($P_a$, $P_b$ and $P_c$) as part of projector 1 each 120° to each other as shown in FIG. 1, the first facet crossing reference line OQ of FIG. 17 is normal to triangular mirror 5 and the next facet crossing the reference line 120° later should line up normal to the same triangular mirror 5 but with the third mirror 5 face or 240° advanced. The angle $\delta$ in FIG. 17 becomes equal to $\theta$ and the final equation for these conditions becomes:

$$\sin 4\theta = \tfrac{8}{3} (\sin \beta)$$

Table 3 shows relationships between $\theta$ and $\beta$ in the above equation and the ratio $\beta/\theta$ is indicative of the expected geometric distortion. Ideally, $\beta/\theta = 6$, but grows to 6.8 at $\beta = 60°$ (the maximum one-half view angle at aerial slit $S_x$). The percentage distortion in the horizontal plane at $\beta = 60°$ is $(6.8-6)/6.8 = 11.8\%$. This distortion is not expected to be noticed, especially at the periphery of the picture.

Table 3

Relations of Projection and Viewing Angles in a Forced Ray Geometry

| $\beta$ (deg.) (½ view) | $\theta$ (deg.) (½ proj.) | $\beta/\theta$ (distort) | % distort |
|---|---|---|---|
| 0 | 0 | 6 | 0 |
| 5 | .845 | 6 | 0 |
| 10 | 1.67 | 6 | 0 |
| 20 | 3.3 | 6.05 | 0.8 |
| 30 | 4.85 | 6.2 | 3.2 |
| 40 | 6.35 | 6.3 | 4.8 |
| 50 | 7.7 | 6.5 | 7.7 |
| 60 | 8.8 | 6.8 | 11.8 |

The preceding discussion is only relevant for a ray leaving projector 1 and aimed at the rotation axis of a triangular mirror 5. To determine aberration at aerial slit $S_x$ due to physical face size of triangular mirror 5, the geometry shown in FIG. 18 can be used when the mirror is frozen at angle $\theta$. Angle $\phi$ is that portion of the projection angle that is subtended by one-half of a triangular mirror 5 side. Knowing the value of $\phi$ for an allowable deviation distance D at aerial slit $S_x$, will enable calculation of the triangular mirror 5 size for a static case. A triangular mirror face moves from 5 to 5' over angle $\theta$ while projector 1 sweeps angle $\phi$.

Figure 18:
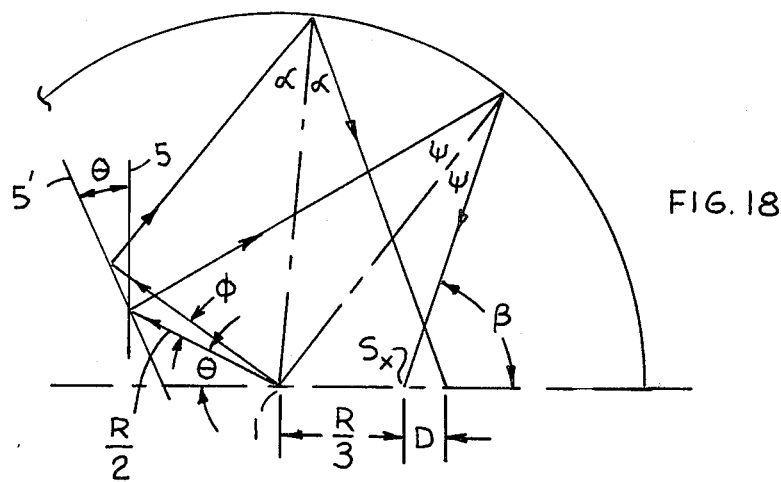
FIG. 18 shows a plan view of the basic projection geometry to determine triangular mirror size for a given aberration at the aerial exit slit according to my invention.

From FIG. 18, it can be shown mathematically that:

$$D = \frac{R \sin\alpha}{\sin(2\alpha + 3\theta + \phi)} - R/3 \text{ and that,}$$

$$\sin\alpha = \frac{0.5 \sin(4\theta + 2\phi)\cos 2\theta}{\cos(2\theta + \phi)}.$$

Table 4 shows how angle $\phi$ varies with screen 4 radius R for an aerial slit $S_x$ uncertainty of 0.5 inch. Table 5 shows the same data as table 4 but for an aerial slit $S_x$ uncertainty of 1.0 inch.

Table 4

Aerial Slit Uncertainty of 0.5 inch

| $\phi$ (deg.) | R (inch) |
|---|---|
| .58 | 100 |
| .29 | 200 |
| .195 | 300 |
| .15 | 400 |
| .12 | 500 |
| .098 | 600 |
| .068 | 900 |
| .06 | 1000 |

Table 5

| Aerial Slit Uncertainty of 1.0 inch | |
|---|---|
| φ (deg.) | R (inch) |
| 1.2 | 100 |
| .6 | 200 |
| .4 | 300 |
| .3 | 400 |
| .25 | 500 |
| .2 | 600 |
| .12 | 1000 |

Keeping in mind that $\phi$ is one-half the angle subtended by a triangular mirror 5 face at the scan projector 1 center, then for an audience size of about 400 people with a screen 4 radius of 800 inches and a scanner 2 radius of 400 inches, the triangular mirror 5 face for an uncertainty of aerial slit $S_x$ location of 1 inch, is 2 inches. If the 2 inch triangular mirrors 5 of FIG. 16 could be used during the "dynamics" of scanning, this solution would be an immediately practicable approach to correct spherical aberration. However during the time scan projector 1 traverses arc d of FIG. 2 "between" adjacent triangular mirrors 5 rotation axes, there is a severe angular sweep perturbation of the image across screen 4 where the image position is only correctly placed when scan projector 1 optical axis and rotation axis of a triangular mirror 5 on scanner 2 intersect. It is now necessary to inject "dynamics" into this approach and calculate the absolute maximum size of a triangular mirror 5 on scanner 2 for a continuously operating dynamic system.

Figure 19:
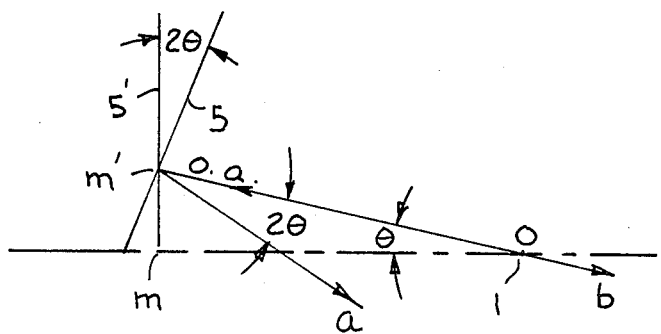
FIG. 19 shows a plan view of the dynamics of the projection system with the deviation angle in a returning ray from a rotating triangular mirror scanner element.

FIG. 19 shows the geometry to determine the deviation angle of reflected rays from the limits of a triangular mirror 5 in scanner 2. If projection 1 axis o.a. swings $\theta$ degrees from om to om', triangular mirror 5 will swing 2 $\theta$ degrees from 5 to 5' and reflected ray a will make a 2 $\theta$ degree angle with respect to the ideal axial return ray b. Taking the criteria that an observer at the center of the theatre should see adjacent screen picture elements subtend 1 minute of arc at his eye, then the allowed shift of the deviated ray during rotation of a triangular mirror 5 would be R/3440. Since in FIG. 2, triangular mirror 5 is at a distance of 3R/2 from screen 4 and R/3440 is subtended by 2 $\theta$ at 3R/2 radius, $\theta = 1/(3)(3440)$ radians (or one-third of a minute of arc). Triangular mirror 5 subtends an angle of 2 $\theta$ at R/2 where R is 400 inches for an audience size of 400 people. The face width of triangular mirror 5 calculates to 0.078 inches or 12,200 mirror-triangles 5 are required to span scanner 2 arc by $120° + 2(8.8°) = 137.6°$ in FIG. 17. A solid state electronically controlled multi-micro-mirror surface is in view. The above method is however, a total solution to spherical aberration in this projection system which will assure that all rays projected onto screen 4 of FIG. 1 will return to aerial exit slit $S_x$ within a small fraction of an inch due to the required narrow dynamic deviation angle reflected from a face of a triangular mirror 5 on scanner 2. Utilizing the simplified and practicable relationships described in FIG. 14 and Table 2 in which triangular mirrors 5 have a 2 inch face and rotate at the "same" angular velocity as scan projector 1, provides a solution to the projection system with State of the Art components but possessing aerial slit $S_x$ growth due to uncorrected spherical aberration. As mentioned, only empirical data can absolutely ascertain the human factors of viewing the final picture.

In the mechanization of projector 1, factors of importance are: adaptability to the overall 3-D theatre system concept; sufficient light output; steadiness of picture and simplicity of design. In the conceptual design of the total system, consideration was given to two methods of projection which could provide automatic image motion compensation for projector 1. The two methods considered were the mirror drum and the multifacet (polygon) prism. The mirror drum approach is described in FIG. 20, FIG. 21 and FIG. 22, as a method to assure resolution and steadiness on the screen but suffers from the problem of light loss due to a large f-number of projection lens 31 of FIG. 20. FIG. 20 shows an approach for the mirror compensator. To obtain the precession feature of FIG. 10, static mirror segments 30, are positioned at one-half film arc 20 radius. The radial center position of adjacent mirror segments is progressively shifted so that at 60° away from the reference the picture frame image is shifted one-half frame. Film frame $F_1$ center aligns with mirror 30a center but film frame $F_7$ edge aligns with mirror 30g center. This approach necessitates an intermittent motion of the film frames. Film frames are shown in FIG. 20 as $F_1$, $F_2$, $F_3$, $F_4$, etc., with an L or R subscript depending on the frame location with respect to the centerline. The intermittent motion timing is considerably different from standard film advance in conventional theatre projectors.

FIG. 21 shows the timing requirements for intermittent advance of film 20 in the mirror segment 30 compensator approach. Since there are 3-facets (or 3 complete projection optic's sets $P_a$, $P_b$ and $P_c$, required in each revolution of the scan projector), the time interval between facet arms is 1/48 second. In FIG. 21, filmstrip 20 occupies arc AC. Arc AB = arc BC. The time interval for a scanner arm $P_a$, $P_b$ or $P_c$ to transit from A to C is 1/48 second. Film 20 arc AB is held stationary until scan arm $P_a$ reaches B at which time film 20 arc AB is advanced the equivalent of one camera frame in 1/96 second (into a tiny service loop at B). When scan arm $P_b$ starts at A, film 20 arc BC is advanced the equivalent of one camera frame in 1/96 second tending to undo the tiny 1 frame service loop. This kind of sequential advancing of the film 20 arc provides room for a film 20 service loop at B which will aid in film acceleration. The number of film 20 frames in arc AC is arbitrary in FIG. 21 to simplify the drawing. In reality, the aerial slit locus circle 6 of FIG. 6 is $2\pi R/3$ where R is screen 4 radius. If the observer's interoccular spacing of 2.5 inches is divided into one-third of aerial slit locus circle 6 circumference, the number of film frames required in film 20 arc AC are 3.4R where R is in feet. From the calculations of theatre screen 4 size related to audience size in FIG. 26 and Table 6, there results 116 pictures for 100 to 200 people and 258 pictures for 500 to 1000 people. If 35 mm film is used in the projector with the film frames printed in the normal manner, the pitch of each frame is 0.75 inches. Film arc AC of FIG. 21 will have a radius of 3.43 feet for 100 to 200 people and 7.7 feet for 500 to 1000 people. A large number of people in the audience calls for a large number of film frames in film arc AC and hence, a large scan radius. The scan projector 1 with facets $P_a$, $P_b$ and $P_c$ is purely inertial (and therefore very quiet) and these angular velocities are reasonable. A practical audience size might be 200 to 400 people.

From FIG. 20, it can be seen that the closest distance that projection lens 31 can be from the bright virtual image at center O of the arc of mirrors 30 is just in excess of one-half the film 20 radius r. Therefore the projection f-number is very large and the screen light level tends to be reduced. FIG. 22 shows a side elevation view of the projector and the optics arrangement to project the second picture to triangular mirror scanner 2 from which it is scanned onto screen 4. In FIG. 22, projection lens 31 optical axis o.a. is maintained normal to film 20 and screen 4 so as to avoid keystone distortion in projection. A 90° image re-orientor to compensate for horizontal film drive is not shown as the picture frames could be pre-oriented on the film. Relay condensing optics RO would tend to prevent light loss in the long transit distance between centralized lamp source 32 and film arc 20. Light from lamp 32 passes through optics RO and reflects from 120° stationary cone mirror 33, passes through film arc 20 and reflects from multiple mirror segment arc 30 through projection lens 31 to screen 4 via scanner 2. Bright images of film frames 20 are formed on scan center line O at $20_i$.

The mirror segment image motion compensator of FIG. 20, FIG. 21 and FIG. 22 is superior to the polygon prism compensator of FIG. 23 and FIG. 24 from the standpoint of picture steadiness and resolution, but suffers from poor light utilization and the need for intermittent film frame movement. A more practicable approach to image motion compensation, compared with the mirror segment compensator, is the polygon prism compensator shown in FIG. 23 and FIG. 24 in which a single 16 facet high speed rotating prism 21 on the projector scan axis O will allow a much higher screen 4 picture illumination level and will provide the desired non-intermittent continuous motion film 20 transit at the standard speed of 24 frames/second.

FIG. 23 and FIG. 24 show a simplified schematic plan and side elevation view, respectively of the 3-facet prism projector having arms $P_a$, $P_b$ and $P_c$. Film 20 is pulled over 120° film are AB at a constant speed corresponding to 24 frames per second. The films arc AB radius is chosen in accord with the aforementioned precession features of FIG. 10 in which the original camera optical axis of FIG. 5 and the projection optical axis o.a. progressively deviate away from coincidence at the center of scan window AB. This deviation is in opposite directions on either side of scan center position OM in FIG. 10. In FIG. 23, scan center is represented by o.a. which bisects arc AB. Relay condensing optics RO of FIG. 24 maximize useage of available lumens from projection lamp 32. The light for any of the scan arms $P_a$, $P_b$ or $P_c$, reflects from stationary cone mirror 33 through film arc 20. The film image is relayed by lens $L_R$ to a field lens $L_F$ and then passes through image motion compensating 16 facet rotating prism 21 and is projected toward triangular elemental mirror scanner 5 of FIG. 2 or in the direction of the arrow on $P_a$ optical axis o.a. The three scanning arms $P_a$, $P_b$ and $P_c$ contain identical optics and the 3 facet projector assembly yoke (containing the three scan arms each with 120° separation) rotates about scan axis O at 16 r/s to give a refresh rate of 48 Hz on screen 4 of FIG. 2. A 90° image re-orientor to compensate for horizontal film drive, is not shown as the film images on film arc 20 may be given a 90° turn during film printing if desired. In order to assure proper compensation, sprocket 22 motion and the 16 facet prism 21 drive must be appropriately linked in FIG. 23. For an audience of 100 to 200 people and 116 film frames occupying the 120° arc, the 16 facet prism would spin at 348 r/s. For an audience of 500 to 1000 people and 258 film frames occupying the 120° arc, the 16 facet prism would spin at 774 r/s.

It is possible that standard theatres can be converted into 3-D theatres using the principles discussed in this specification. In this case, the projection booth would not be used but instead the scan projector would be placed overhead somewhere near the center of the auditorium. An overhead triangular mirror scanner array would be installed and a concentric circular cylinder screen constructed with a 120° arc to replace the old flat screen hanging in the proscenium arch.

There is a question concerning hazards to the safety of the audience with the rotating triangular mirrors 5 of FIG. 2. The triangular mirror scanner array 2 would occupy a 160° circular arc (i.e. 120°+20° on either side for one-half projection angle intercept) with radius equal to one-half of screen radius R. Scanner 2, therefore, would occupy an arc length of two thirds of screen 4 arc length. The height of triangular scan elements 5 of FIG. 3 would be 7.5 feet for screen 4 height of 30 feet. It is envisioned that triangular mirror scanners 5 would be made in one piece and designed for light weight and maximum rigidity so as to function within reasonable optical tolerances due to windage distortion. These triangular surfaces would be aluminized with a protective overcoat. Means should be provided to prevent the accumulation of dust particles on the mirror surface. There would be approximately 281 (2 inch equilateral) triangular rotating mirrors 5 in scanner 2 for an audience of 100 to 200 people and 629 for an audience of 500 to 1000 people.

If an existing theatre were converted and the triangular mirrors 5 in scanner 2 were arranged overhead, were light weight and assembled into the proper bearings, it appears that the scanner 2 design could preclude any hazards to the audience.

Figure 25:
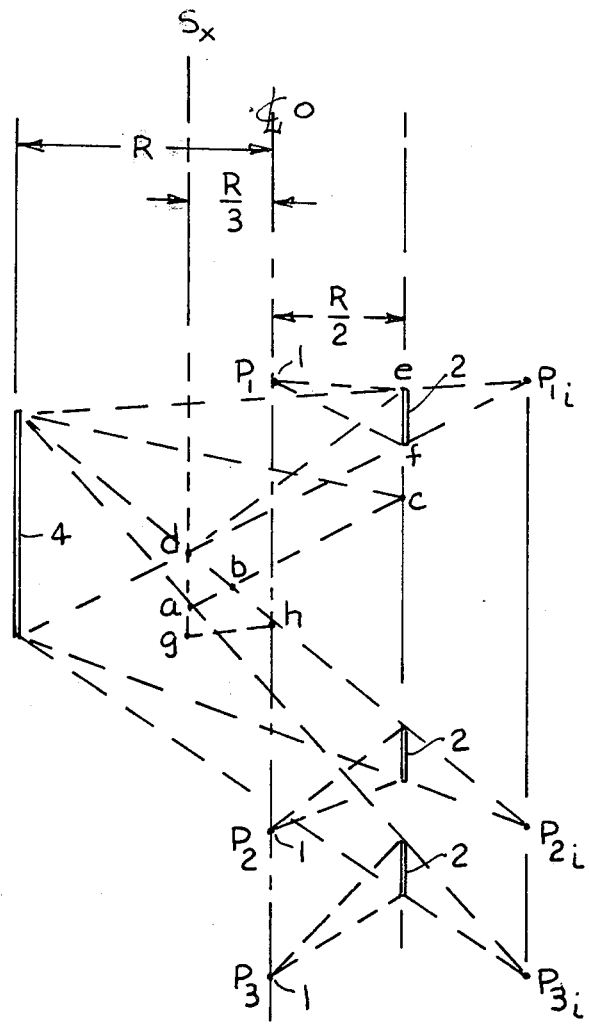
FIG. 25 shows a simplified side elevation of the stereoscopic theatre with alternative relative positions between projector, scanner, screen and audience according to my invention.

FIG. 25 provides several trade offs in the relative positioning of scan projector 1 at $P_1$, $P_2$ or $P_3$ and the scanner assembly 2 of triangular mirrors 5 with respect to screen 4. Aerial slit $S_x$ is shown at one-third screen 4 radius and triangular scanner 2 assembly of FIG. 2 is shown on the opposite side of axis of rotation O at one-half the screen 4 radius as shown in FIG. 25. It can be seen from FIG. 25 that re-positioning projector 1 and scanner 2 to positions 2 and 3 in order to eliminate the possible hazard from the overhead scanner at $P_1$, causes the depth of the theatre basement to become excessive. For position 2, screen 4 is below the audience inclined plane de or if the audience plane is dropped to ac, the ab link would be deleted due to projected ray interference. In position 2, the audience would probably be located on plane df. In position 3, the basement depth is too great but the audience has an excellent view of screen 4 from plane ac which utilizes the whole audience available space. Plane ac could also be used with scanner 2 and projector 1 in position 1. The best position for scanner 2 and projector 1 is over the audience (as position 1) in which case if the main audience is seated on plane df (i.e. balcony) another main floor audience segment might also be installed as in gh. The audience plane is quite flexible and can be anywhere from d to g at the front elevation and inclined from horizontal up to the df incline where the lower limiting projection ray begins to cause interference. If the audience safety factor is still considered a problem, the triangular scanners 5 of FIG. 2 could be installed in the cylindrical wall at the rear of the theatre and a protective high strength transparent cover such as LEXAN installed along the inside wall surface. This should reduce aerodynamic forces but would also decrease screen 4 illumination by about 15 percent.

Figure 26:
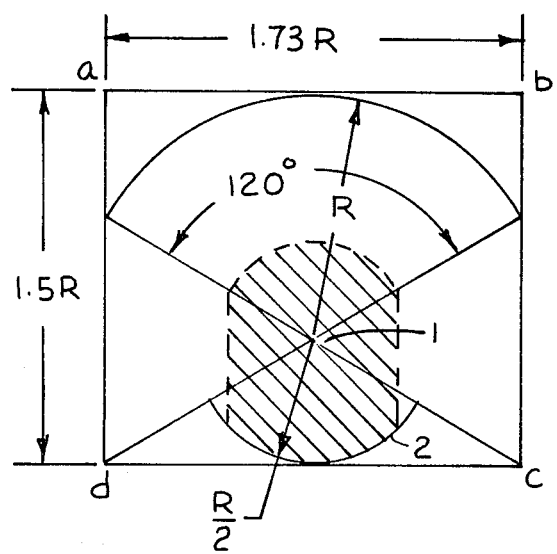
FIG. 26 shows a simplified plan view of a stereoscopic motion picture theatre with projector, scanner, screen and audience according to my invention.

FIG. 26 shows a plan view of a stereoscopic motion picture theatre in which a rectangular enclosure abcd is used to house the projection system and the audience area is shown shaded. The theatre size is shown in terms of screen 4 radius R. To determine the size theatre for a desired seating capacity, one tier of seating will be evaluated. It will be possible to double the seating capacity of the single tier for any of the calculated theatre sizes with corresponding reduced visibility of the total scene for a portion of the audience. If A=number of people in a row and the inter-seat spacing is taken at 22 inches; and if B=the number of rows and the back to back seat space is taken at 36 inches, formulas can be developed for A and B in terms of R. It can be shown mathematically, that A=0.31R and B=0.28R. The length of the ideal audience section is 0.84R and the width of the ideal audience section is 0.57R. Table 6 shows the relationships in theatre size to audience size and screen size.

Table 6

| Theatre and Screen Size Vs Audience | | | | | |
|---|---|---|---|---|---|
| No. of People | | Theatre Size (feet) | | Screen Size (Feet) | |
| compro view | good view | width | length | radius | arc length |
| 200 | 100 | 58 | 51 | 34 | 71 |
| 1000 | 500 | 132 | 114 | 76 | 159 |

Experimental work on the screen for the smaller 3-D movie projector (the subject of my U.S. Pat. No. 4,089,597 dated May 16, 1978) which is the practicable forerunner of the large screen theatre 3-D viewing system described in this specification, indicates very acceptable results are found with a horizontally brushed stainless steel screen used for screen 4 of FIG. 26. This screen gives the proper horizontal reflection and vertical scatter required to make the system work as described. However, there may be a less expensive screen material that will also give the desired results. Attention is directed to a new product by the 3-M Company, called optically "shaped" plastic film (OSF). Fresnel lens technology is applied to the plastic surface using convexed, concaved and prismatic grooves and the surface has a polished metal appearance.

Having thus fully described my invention and the manner in which it is to be practiced, I claim:

1. A method of recording and reproducing stereoscopic views for observation by plural observers without visual acids at the eyes of said observers, comprising:

photographing multiple sequential views of a scene from a motion picture camera in a manner such that between each sequential view relative motion takes place between the camera and scene, and the optical axis of the camera for the various views is essentially coincident or parallel with each other; reproducing said views sequentially by projecting the views from a rotating and radially outward projecting multifacet scan projector; said scan projector rotating about a central vertical rotation axis; said views being projected toward a concentric cylindrical arc of elemental scanning mirrors synchronized in motion with said scan projector; said arc of scanning mirrors reflecting said sequential views to a concentric stationary concaved screen on the opposite side of said vertical axis; said screen comprised of highly reflective horizontal corrugated ridges to vertically scatter incident light rays from said scan projector, and to horizontally reflect said light rays; said camera optical axes of said sequential views being coincident with said scan projector optical axis when projecting said views onto the center of said screen, and laterally shifted with respect to said scan projector optical axis for off-center projection on said screen; said shifted camera optical axis occuring in said scan projector and being sufficient to cause said camera's optical axes reflection from said screen to remain essentially parallel during the horizontal sweep motion of said sequential views across said screen by said scan projector; said light rays in projected views reflective from said screen to pass through a vertical aerial exit slit moving in a concentric circle about said central vertical rotation axis; said aerial slit located between said screen and said axis; and the scanning rate of said projector sufficient to be within the period of persistence of vision of an observer.

2. A construction for displaying motion pictures stereoscopically to a large number of observers situated in front of the viewing screen of said construction, said construction including: a high reflective concentric concaved viewing screen comprised of horizontal corrugated ridges, a concentric arc of elemental triangular scanning mirrors on the opposite side of a central vertical axis from said screen, one or more radical scan-projectors synchronized with said scanning mirrors and rotating about said vertical axis, said scan-projector comprised of a high speed polygon prism with rotation axis coincident with said vertical axis, a central lamp source, relay condensing and projection optics, motion picture film constrained to a circular film guide having axis coincident with said vertical axis, each sequential picture frame of said film image motion compensated by precess correlation of said film frames with corresponding prism faces, said film either stationary or continuously moving with respect to the rapid scan of said projector, said concentric arc of triangular scanning mirrors reflecting said projected film frames from said scan projector toward said screen, said screen reflecting said projected views to a concentrically moving vertical aerial exit slit located between said screen and said vertical axis, said slit rotating at the same angular velocity as said scan projector.

\* \* \* \* \*

UNITED STATES PATENT AND TRADEMARK OFFICE
CERTIFICATE OF CORRECTION

PATENT NO. : 4,176,923

DATED : December 4, 1979

INVENTOR(S) : Robert B. Collender

It is certified that error appears in the above-identified patent and that said Letters Patent are hereby corrected as shown below:

Claim 1, line 3, "acids" should read --- aids ---.

Signed and Sealed this

First Day of July 1980

[SEAL]

Attest:

SIDNEY A. DIAMOND

Attesting Officer

Commissioner of Patents and Trademarks